United States Patent
Duchaine et al.

(10) Patent No.: US 10,814,493 B2
(45) Date of Patent: Oct. 27, 2020

(54) TACTILE SENSOR AND A METHOD OF MANUFACTURING THEREOF

(71) Applicant: ÉCOLE DE TECHNOLOGIE SUPÉRIEURE, Montreal (CA)

(72) Inventors: Vincent Duchaine, Mont-Saint-Hilaire (CA); Thuy Hong Loan Le, Montreal (CA); Alexis Maslyczyk, Montreal (CA); Axay Kumar Rana, Pierrefonds (CA)

(73) Assignee: ROBOTIQ INC., St. Nicholas (CA)

( * ) Notice: Subject to any disclaimer, the term of this patent is extended or adjusted under 35 U.S.C. 154(b) by 0 days.

(21) Appl. No.: 16/477,675

(22) PCT Filed: Jan. 12, 2018

(86) PCT No.: PCT/CA2018/050033
§ 371 (c)(1),
(2) Date: Jul. 12, 2019

(87) PCT Pub. No.: WO2018/129626
PCT Pub. Date: Jul. 19, 2018

(65) Prior Publication Data
US 2020/0039084 A1    Feb. 6, 2020

Related U.S. Application Data

(60) Provisional application No. 62/445,394, filed on Jan. 12, 2017.

(51) Int. Cl.
*G01L 5/00*    (2006.01)
*G01L 9/00*    (2006.01)
(Continued)

(52) U.S. Cl.
CPC ............. *B25J 13/084* (2013.01); *B25J 13/02* (2013.01); *B25J 15/022* (2013.01); *G01L 1/14* (2013.01);
(Continued)

(58) Field of Classification Search
CPC ......... B25J 13/084; B25J 15/022; G01L 1/14; G01L 1/20; G01L 5/228
(Continued)

(56) References Cited

U.S. PATENT DOCUMENTS

| | | | |
|---|---|---|---|
| 4,526,043 | A | 7/1985 | Boie et al. |
| 4,584,625 | A | 4/1986 | Kellogg |

(Continued)

OTHER PUBLICATIONS

Long Lin et al., Triboelectric Active Sensor Array for Self-Powered Static and Dynamic Pressure Detection and Tactile Imaging, ACS Nano 2013 7 9 8266-8274.
(Continued)

*Primary Examiner* — Max H Noori
(74) *Attorney, Agent, or Firm* — Anglehart et al.

(57) ABSTRACT

A capacitive or resistive tactile sensor having a conductive membrane, a flexible dielectric or weakly conductive sheet and a substrate having electrodes, and a method of manufacturing thereof. The flexible sheet has a first surface and an opposite second surface, the first surface and the second surface are uniformly distanced when at rest. The first surface is adapted to contact one of the conductive membrane or the substrate. The second surface is adapted to contact another one of the conductive membrane or the substrate. The body defines between the first and second surfaces, at a predetermined region, a plurality of laser ablated uniform cavities that are evenly distributed and operatively identical in order to provide a known compression index at the predetermined region of the flexible sheet. The substrate has uniformly distributed static pressure sens-
(Continued)

ing electrodes and at least one uniformly spread dynamic pressure sensing electrode, which is located between the static pressure sensing electrodes, and is used for measuring a voltage or a current variation with the conductive membrane according to the deformation of the flexible sheet.

19 Claims, 13 Drawing Sheets

(51) Int. Cl.
    *B25J 13/08*     (2006.01)
    *B25J 13/02*     (2006.01)
    *G01L 5/22*     (2006.01)
    *B25J 15/02*     (2006.01)
    *G01L 1/14*     (2006.01)
    *G01L 1/20*     (2006.01)

(52) U.S. Cl.
    CPC ............... *G01L 1/20* (2013.01); *G01L 5/228* (2013.01); *G01L 9/0051* (2013.01); *G01L 9/0072* (2013.01)

(58) Field of Classification Search
    USPC ...................... 73/862.042, 862.942
    See application file for complete search history.

(56) References Cited

U.S. PATENT DOCUMENTS

| | | | |
|---|---|---|---|
| 5,173,441 A | 12/1992 | Yu et al. | |
| 5,563,354 A | 10/1996 | Kropp | |
| 5,857,250 A * | 1/1999 | Riley | G01N 27/221 29/25.42 |
| 5,989,397 A * | 11/1999 | Laube | C23C 14/021 118/620 |
| 6,632,178 B1 * | 10/2003 | Fraser | B06B 1/0292 600/459 |
| 7,878,075 B2 | 2/2011 | Johansson et al. | |
| 8,879,274 B2 * | 11/2014 | Wilson | C23F 4/00 174/250 |
| 10,085,798 B2 * | 10/2018 | Cao | A61B 18/1492 |
| 2001/0016982 A1 * | 8/2001 | Blair | H01P 1/2056 29/831 |
| 2001/0020320 A1 * | 9/2001 | McIntosh | B81B 3/0086 29/25.41 |
| 2001/0032493 A1 * | 10/2001 | Samman | G01N 27/129 73/31.06 |
| 2002/0033048 A1 * | 3/2002 | McIntosh | G01D 5/2417 73/514.32 |
| 2003/0089261 A1 * | 5/2003 | Landsman | B41C 1/1033 101/467 |
| 2003/0148401 A1 * | 8/2003 | Agrawal | B01J 19/0046 506/9 |
| 2003/0180472 A1 * | 9/2003 | Zhou | B05D 1/18 427/430.1 |
| 2004/0188150 A1 * | 9/2004 | Richard | G06F 3/041 178/18.01 |
| 2007/0016117 A1 * | 1/2007 | Sliwa, Jr. | A45D 26/00 601/46 |
| 2008/0180875 A1 * | 7/2008 | Biggs | H01G 2/14 361/273 |
| 2008/0297176 A1 * | 12/2008 | Douglas | H03K 17/955 324/686 |
| 2009/0122463 A1 * | 5/2009 | Nguyen | H01G 4/12 361/321.2 |
| 2009/0166612 A1 * | 7/2009 | Cain | H01L 51/0022 257/40 |
| 2010/0143848 A1 * | 6/2010 | Jain | B81C 1/0019 430/315 |
| 2010/0200539 A1 * | 8/2010 | Yun | G06F 3/044 216/13 |
| 2012/0055257 A1 * | 3/2012 | Shaw-Klein | H01L 41/081 73/780 |
| 2012/0217145 A1 * | 8/2012 | Yi | G06F 3/044 200/5 A |
| 2012/0265070 A1 * | 10/2012 | Sliwa | A61B 8/085 600/439 |
| 2012/0283715 A1 * | 11/2012 | Mihalik | A61B 18/02 606/21 |
| 2014/0041904 A1 * | 2/2014 | Pedder | G06F 3/044 174/251 |
| 2014/0238153 A1 | 8/2014 | Wood et al. | |
| 2014/0238833 A1 * | 8/2014 | Virkar | H03K 17/9622 200/600 |
| 2015/0148643 A1 * | 5/2015 | Small | A61N 5/0622 600/377 |
| 2015/0173187 A1 * | 6/2015 | Zeng | G06F 3/044 174/255 |
| 2015/0272669 A1 * | 10/2015 | Brucker | A61B 18/1492 606/41 |
| 2015/0277630 A1 * | 10/2015 | Kao | G06F 3/0412 345/174 |
| 2015/0355039 A1 | 12/2015 | Duchaine et al. | |
| 2015/0370374 A1 * | 12/2015 | Chan | B23K 26/18 219/121.68 |
| 2016/0004349 A1 * | 1/2016 | Prieto Rio | B23K 26/364 29/622 |
| 2016/0052131 A1 * | 2/2016 | Lessing | B25J 9/142 361/679.01 |
| 2016/0162079 A1 | 6/2016 | Jing et al. | |
| 2016/0324443 A1 * | 11/2016 | Rowland | A61B 5/076 |
| 2017/0046008 A1 * | 2/2017 | Chen | G06F 3/0418 |
| 2017/0068359 A1 * | 3/2017 | Ahn | G06F 3/0412 |
| 2018/0009198 A1 * | 1/2018 | Weber | B32B 17/10036 |
| 2018/0119308 A1 * | 5/2018 | Zeng | C30B 29/04 |
| 2019/0059152 A1 * | 2/2019 | Boozer | H05K 1/0216 |
| 2019/0115900 A1 * | 4/2019 | Hahn | H01G 4/30 |
| 2019/0160792 A1 * | 5/2019 | Weber | B32B 17/10192 |
| 2019/0202228 A1 * | 7/2019 | Siebert | B42D 25/369 |
| 2019/0346973 A1 * | 11/2019 | Kira | H01L 51/5281 |

OTHER PUBLICATIONS

PCT/CA2018/050033 IPRP
PCT/CA2018/050033 ISR.
PCT/CA2018/050033 search strategy.
PCT/CA2018/050033 written opinion.
SCB Mansfield et al., Highly sensitive flexible pressure sensors with microstructured rubber dielectric layers, Nature Materials vol. 9, pp. 859-864 (2010).
U.S. Appl. No. 16/510,626 Office Action dated Oct. 2, 2019.

* cited by examiner

TACTILE SENSOR AND A METHOD OF MANUFACTURING THEREOF

CROSS-REFERENCE TO RELATED APPLICATIONS

This application claims priority of U.S. provisional patent application 62/445,394, filed Jan. 12, 2017, the content of which is hereby incorporated by reference.

TECHNICAL FIELD

The present relates to tactile sensors and methods of manufacturing tactile sensors. More specifically, the present relates to dielectrics or to weakly conductive material and conductive plates in capacitive or resistive tactile sensors and to methods of manufacturing dielectrics or to weakly conductive material.

BACKGROUND

As robots have gained importance in the field of manufacturing processes, so in parallel greater automation has been achieved thanks to new technologies. At the beginning of the robotic era, robotic grippers were used in straightforward manufacturing tasks such as for car assembling tasks. However, today robotic grippers must do more than just grasp a same item or similar items repeatedly. Indeed, robotic grippers are expected to be capable of handling complex objects that may have a variety of different shapes, or be made of unstructured fabrics or fragile materials. Robots are now expected to have some "sense" of how to accomplish a manufacturing task and successfully handle a variety of objects without damaging them.

The human hand, with its various mechanoreceptors, remains the best-functioning "device" for object-manipulation tasks. In an attempt to replicate these functions robotically, researchers have developed tactile sensors based on numerous different sensing principles, such as by using piezoresistive rubber, conductive ink, piezoelectric material, conductive fluid, and measuring a change in capacitance. Most of these approaches are about measuring a contact pressure. However, the human sense of touch does not rely on contact pressure alone. It also uses vibration, temperature, and shear loading, among others. These additional modalities let humans recognize surface texture, detect object slippage, and perceive other complex events. With this in mind, some researchers in robotics are now building multimodal tactile sensors in hopes of giving robots a sense of touch that is more similar to the human one. Along with detecting pressure localization and magnitude, these modern sensors can also detect contact events like vibration. For example, some have developed a variable resistor ink sensor that can also detect incipient slip thanks to the use of Polyvinylidene fluoride (PVDF). Others have developed a multimodal sensor for fabric manipulation and classification.

One well-known multimodal sensor is the commercially-available BioTac™ tactile sensor provided by SynTouch LLC and described in U.S. Pat. Nos. 7,658,119, 8,181,540, and 8,272,278 to Loeb et al. The BioTac™ tactile sensor can measure vibrations in addition to temperature and pressure. The tactile sensor has a conductive plate with multiple electrode points arranged in a two-dimensional array such as presented in Prior Art FIG. 1. Each electrode point 100 is connected to an impedance measuring circuitry 102, and is surrounded by a weakly conductive fluid or pulp contained within an elastomeric skin. When an external force is applied to the skin, a variation in the fluid paths around the electrode points produces a distributed pattern of impedance changes indicative of information about the forces and objects that applied them. In one example, the impedance measuring circuitry is configured to detect changes in the electrical impedance of the volume conductive liquid between the electrodes, and to interpret such changes under certain circumstances as being indicative of a shear force that is applied to the skin. The tactile sensor is thereby able to measure micro-vibrations due to sliding friction, as well as to measure pressure. A same electrode 100 is used for providing a micro-vibration measurement and a pressure measurement. The electrodes are alternatingly connected to a vibration sensing subsystem and to a pressure sensing subsystem. A multiplexer 104 selects each electrode in turn for connecting to one of the vibration sensing 106 or pressure sensing 108 measuring circuitries, according to instructions received by a microcontroller 110.

As can be noticed from these sensors, sensors for grasping applications need to be capable of more than simply the ability to sense forces. However, the aforementioned sensors require the use of special materials and complex structures that can be difficult to assemble, fabricate, and maintain. In particular, the Bio Tac™ sensor requires a specialized technician to inject a fluid under the skin, which can result in some downtime since the skin of the sensor can wear out frequently. Moreover, the BioTac™ sensor requires a whole phalange to be replaced in order for it to be integrated with a robotic hand.

Other solutions have been developed to provide multimodal sensing. One solution relates to capacitive sensing. Capacitive sensors appear to be a suitable candidate for multimodal tactile sensing due to their simplicity and easy-to-implement properties. The performance of a capacitive sensor depends on its electrical circuit and the electromechanical characteristics of its dielectric. Researchers have developed capacitive sensors that can perform both static and dynamic sensing by using to integrated circuits (ICs) that enable the sensor's electronic circuit to process the additional data needed for dynamic sensing. As a result, such sensors are capable of classifying various types of contact events.

It has been shown that by cleverly designing the dielectric, the sensor's sensitivity can be greatly enhanced. Several researchers have succeeded in improving the sensitivity of their capacitive sensors by using dielectrics made of elastomer foam and microstructured rubber. Another research group attained extremely high sensitivity using a microstructured dielectric made of nanoparticle-filled elastomer, such as presented in Prior Art FIG. 2A. The sensor 200 has a pair of spaced apart conductive plates 202 with a dielectric 204 there between. The dielectric 204 has a microstructure of a plurality of protrusions 206 conductively extending between the two conductive plates 202. Each protrusion 206 has at least two layers 208 and 210. The first layer 208 having a greater diameter than that of the second layer 210 accounts for significant variations between the two plates 202 and reacts to greater pressure ranges. The second layer 210 accounts for weaker variations between the two plates 202 and reacts to lower pressure ranges. However, these highly sensitive capacitive sensors are inconvenient and time-consuming to manufacture due to the specialized dielectric fabrication processes.

In US Patent Publication No. 2015/0355039 to Duchaine et al. there is presented a method of using invert molding to cast the dielectric out of liquid elastomer filled with nano-particles. The casted dielectric has a dielectric constant of 12. Prior art FIG. 2B depicts the various steps in manufacturing the dielectric. A mold is first provided and is filled with liquid elastomer filler. A conductive fabric is then placed in contact with the filler before curing. Once cured, the combination of the molded dielectric and the conductive fabric is removed from the mold. Prior art FIG. 2C presents a magnified view of the molded dielectric 204. As can be noticed, each protrusion 206 of the molded dielectric 204 has a different shape, and the dielectric does not provide a consistent thickness. Moreover, the method is very time-consuming due to the invert molding process and cannot be applied in mass production of sensors, since the molding process can take several days.

SUMMARY

According to one aspect, there is a method of manufacturing a compressible sheet made from a dielectric material or a weakly conductive material for a sensor. The sensor being adapted to measure either a localized change in capacitance or conductivity corresponding to an applied pressure on the compressible sheet. The method includes, positioning a flexible sheet made from a dielectric material or a weakly conductive material in a laser ablation machine. The method further includes determining a least one ablation path according to a desired pattern of cavities and according to a size and a shape of each cavity of the desired pattern of cavities, and adjusting parameters of the laser ablation machine according to the at least one ablation path and at least one property of the flexible sheet. Then ablating the flexible sheet with the ablation machine according to the adjusted parameters and forming the compressible sheet having a body structure that is complementarily shaped according to the desired pattern of cavities, and removing ablation debris from the body structure. The body structure is adapted to provide a localized compression such that when the compressible sheet is subjected to a localized pressure, an associated portion of the body structure is locally deformed only by at least partially extending into adjacent cavities, according to a deformation ratio that is indicative of the capacitance or resistance of the compressible sheet at the location of the localized pressure.

It has been found that laser ablation of a suitable material can lead to better compressibility properties than by molding a moldable material with suitable feature dimensions.

According to another aspect, there is a dielectric or weakly conductive compressible sheet for a capacitive or resistive tactile sensor. The sheet is positionable between a conductive membrane and a conductive plate of the tactile sensor. The compressible sheet has a body having a first surface and an opposite second surface, the first surface and the second surface is uniformly distanced when at rest. The first surface is adapted to contact one of the conductive membrane or the conductive plate. The second surface is adapted to contact another one of the conductive membrane or the conductive plate. The body defines between the first and second surfaces, at a predetermined region, a plurality of laser ablated uniform cavities that are evenly distributed and operatively identical in order to provide a known compression index at the predetermined region of the compressible sheet.

According to another aspect, there is a substrate for a tactile sensor. The substrate has a dielectric contacting surface, a plurality of static pressure sensing electrodes and at least one dynamic pressure sensing electrode. The plurality of static pressure sensing electrodes are uniformly distributed on the dielectric contacting surface. Each of the plurality of electrodes are adapted to connect to a corresponding one of a plurality of static pressure processing circuits. The at least one dynamic pressure sensing electrode is uniformly spread across the dielectric contacting surface between the plurality of static pressure sensing electrodes. Each of the at least one electrode is adapted to connect to at least one corresponding dynamic pressure processing circuit.

According to another aspect, there is a capacitive or resistive tactile sensor having a conductive membrane, a laser ablated dielectric or weakly conductive sheet, a conductive plate. The conductive membrane is connected to a ground or to a power source and adapted to deform according to an external pressure application. The laser ablated dielectric or weakly conductive sheet has a body with a first surface and an opposite second surface. The first surface is in contact with the conductive membrane and is adapted to deform according to the external pressure application in conjunction with the conductive membrane. The conductive plate has a pattern of electrodes for measuring a voltage variation or a current variation with the conductive membrane according to the deformation of the laser ablated sheet. The second surface is adapted to directly contact the conductive plate. The body defines between the first and second surfaces, at a predetermined region, a plurality of uniform laser ablated cavities that are evenly distributed and operatively identical in order to provide a known compression index at the predetermined region of the compressible sheet.

According to another aspect, there is a method of manufacturing a dielectric sheet for a capacitive tactile sensor. The method includes positioning a dielectric sheet in a laser cutting machine, adjusting a probe height of the laser cutting machine according to a thickness of the dielectric sheet and a preset laser beam focal point distance, etching the dielectric sheet, retrieving the etched dielectric sheet, and removing etching debris from the etched dielectric sheet. The etching includes controlling a displacement and velocity of the probe, according to a predetermined etching pattern and according to the positioning of the dielectric sheet. Moreover, the etching includes controlling a power and frequency of a laser beam focused by the probe onto the dielectric sheet, according to the predetermined etching pattern, in order to form in the dielectric sheet a first region that is full and a second region that defines a plurality of protrusions.

According to another aspect, there is a particular geometry of a dielectric sheet for a capacitive tactile sensor. The dielectric sheet is positionable between a conductive sheet and a conductive plate of the capacitive sensor. The geometry of the dielectric sheet includes a uniform surface, and a dented surface that is opposite to the uniform surface. The uniform surface is adapted to contact either the conductive sheet or the conductive plate. The dented surface is adapted to contact the other one of either the conductive sheet or the conductive plate. The dented surface defines a plurality of frustoconical projections that are evenly distributed and operatively identical. Each of the plurality of frustoconical projections has a base and a truncated tip that is smaller in diameter than the base, the truncated tip is adapted to directly contact the other one of the conductive sheet or the conductive plate.

According to another aspect, there is a capacitive tactile sensor. The capacitive tactile sensor has a conductive sheet, a dielectric sheet, and a conductive plate. The conductive sheet is connected to a ground and is adapted to deform according to an external pressure application. The dielectric sheet has a uniform surface and an opposite dented surface, one of the surfaces is in contact with the conductive sheet and is adapted to deform according to the external pressure application in conjunction with the conductive sheet. The conductive plate has a pattern of electrodes for measuring a voltage variation with the conductive sheet according to the deformation of the dielectric sheet. The dented surface defines a plurality of frustoconical projections that are evenly distributed and operatively identical, each of the plurality of frustoconical projections has a base and a truncated tip that is smaller in diameter than the base, the truncated tip is adapted to directly contact the other one of the conductive sheet or the conductive plate.

According to yet another aspect, there is a conductive plate for a capacitive tactile sensor. The conductive plate has a dielectric contacting surface adapted to contact a dielectric, and an electrically insulated surface opposite the dielectric contacting surface. The dielectric contacting surface has a plurality of static pressure sensing electrodes and at least one dynamic pressure sensing electrode. The plurality of static pressure sensing electrodes are uniformly distributed on the dielectric contacting surface. The at least one dynamic pressure sensing electrode is uniformly spread across the dielectric contacting surface between the plurality of static pressure sensing electrodes. Each of the plurality of electrodes is adapted to connect to a corresponding one of a plurality of static pressure processing circuits and each of the at least one electrode is adapted to connect to at least one corresponding dynamic pressure processing circuit.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
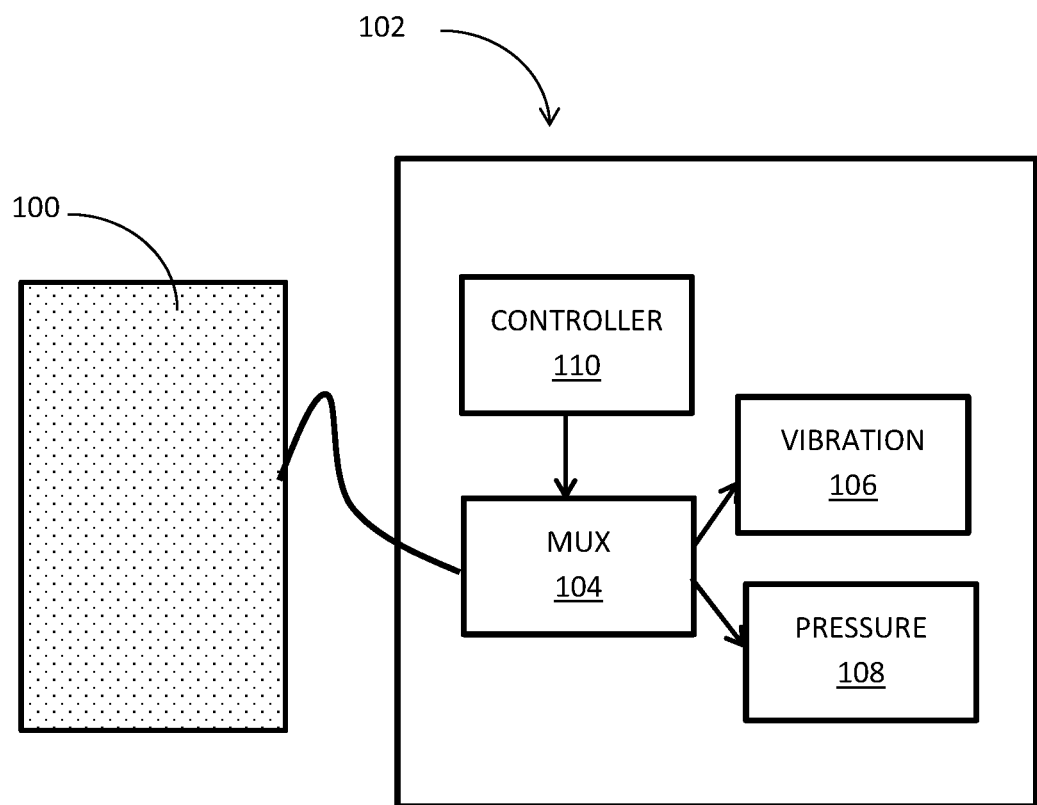
FIG. 1 presents a prior art conductive plate system for sensing static and dynamic pressure.
Figure 2A:
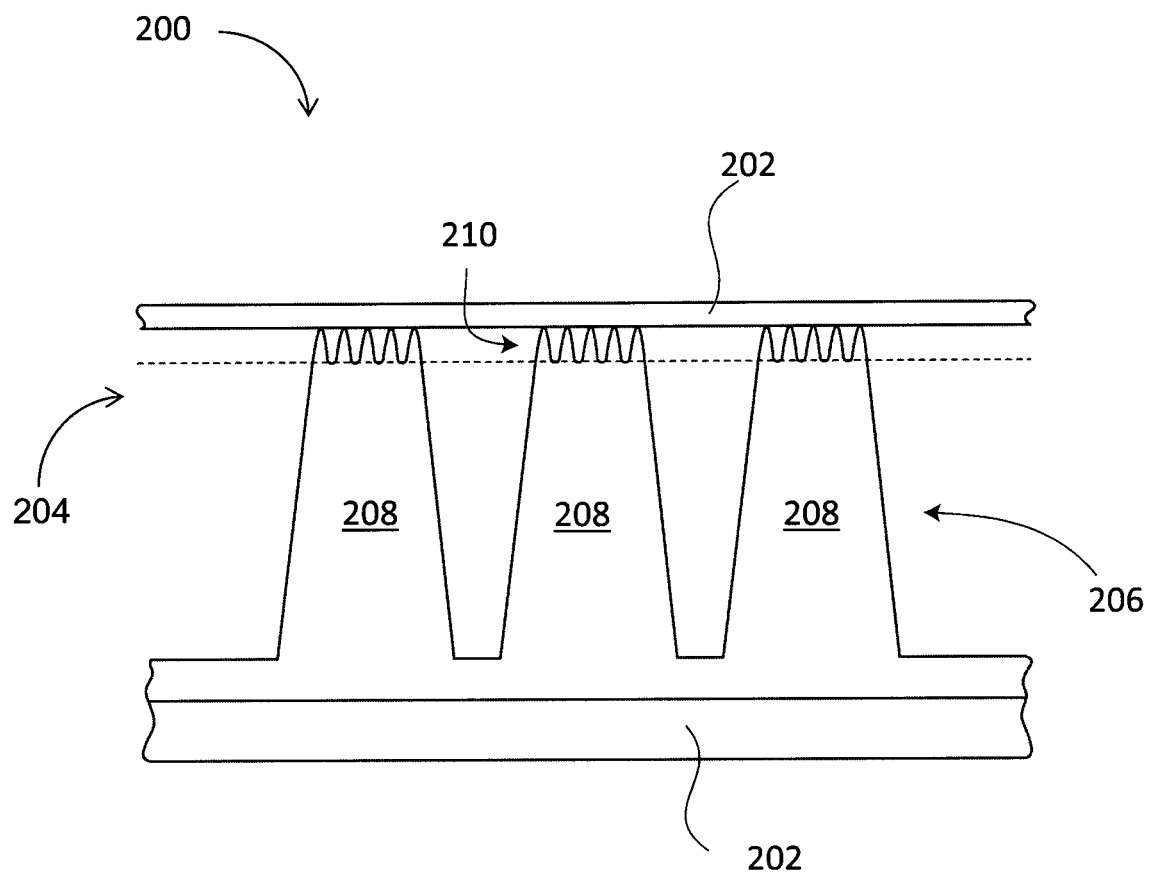
FIG. 2A presents a prior art side sectional view of a tactile sensor having a conductive sheet, a dielectric sheet and a conductive plate.
Figure 2B:
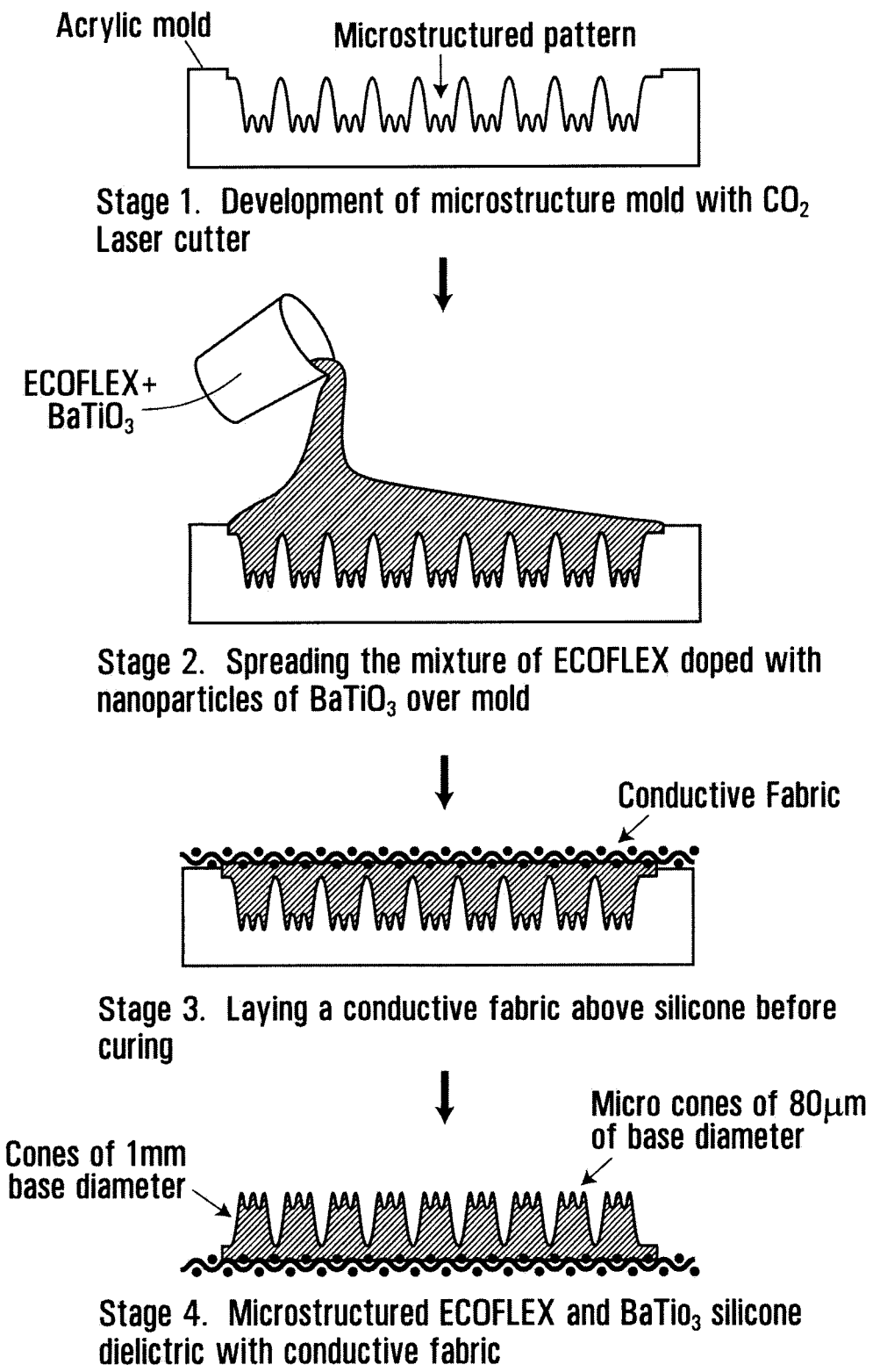
FIG. 2B presents a prior art method of manufacturing the dielectric sheet of FIG. 2A.
Figure 2C:
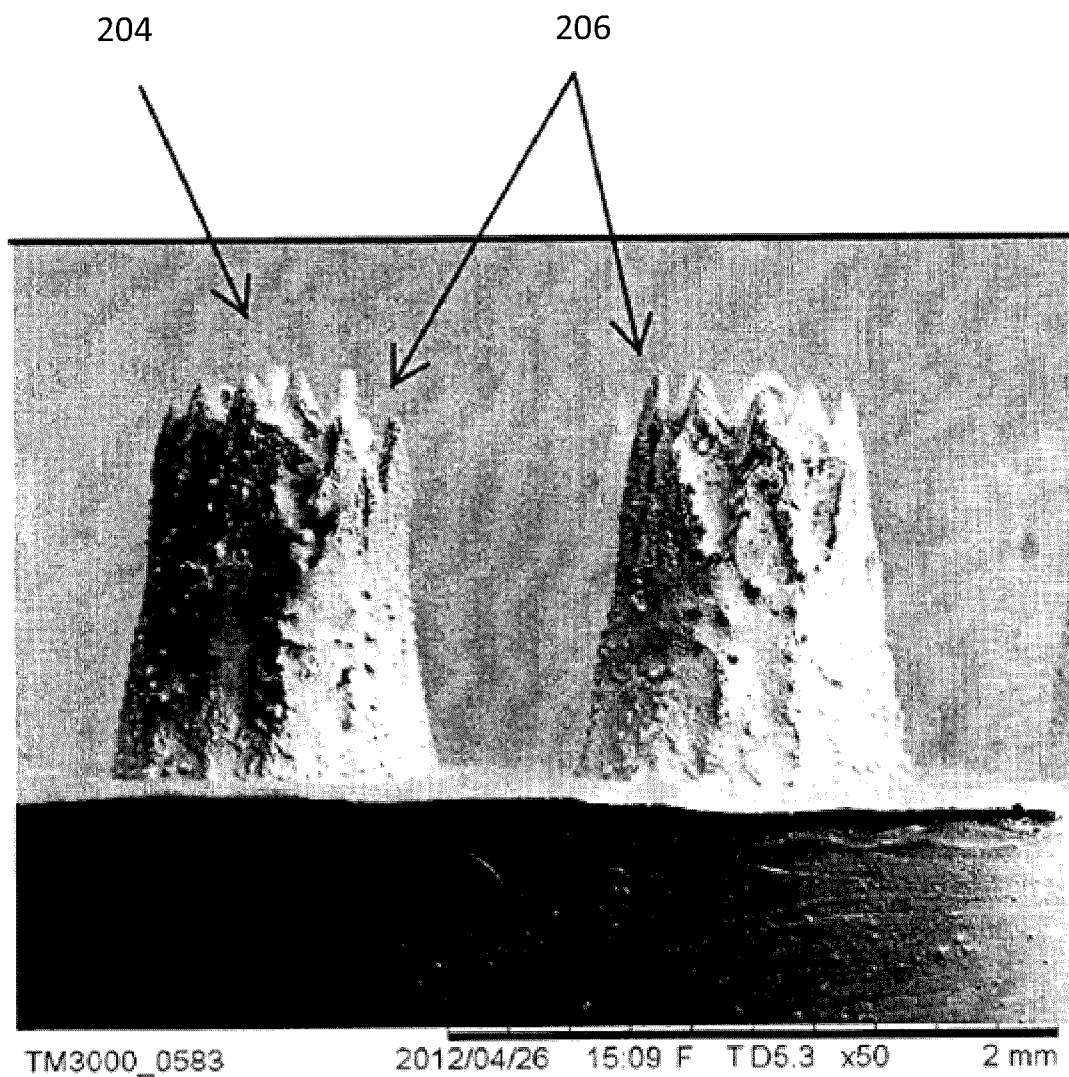
FIG. 2C presents a prior art magnified view of molded protrusions of a portion of the dielectric sheet manufactured by the method presented in FIG. 2B.
Figure 3A:
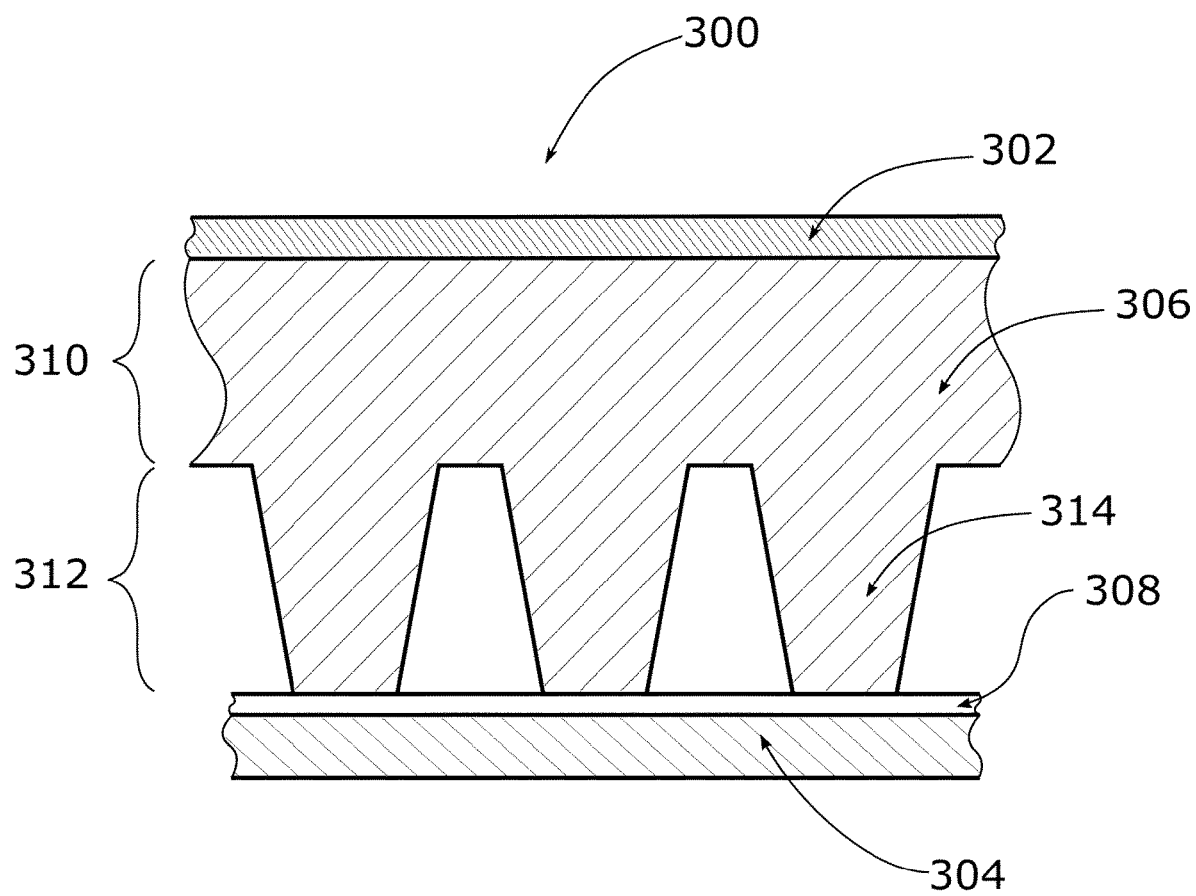
FIG. 3A presents a side sectional view of a tactile sensor having a printed circuit board, conductive film, a dielectric sheet and a conductive fabric, according to one embodiment.

Presented in FIG. 3A is a partial sectional view of a capacitive tactile sensor 300 adapted to transfer a pressure applied on a contact surface terminal 302 towards a pressure detector terminal 304, according to one embodiment. The contact surface terminal 302 is a conductive membrane such as a conductive fabric layer that is electrically grounded for shielding the sensor 300 from external noise. The pressure detector terminal 304 is a conductive plate such as a printed circuit board (PCB) having electrodes adapted to measure a capacitance between the electrodes and the contact surface terminal 302. Between the contact surface terminal 302 and the pressure detector terminal 304 there is a compressible dielectric sheet 306. As presented in FIG. 3B, the dielectric sheet 306 is adapted to compress according to pressure applied to the contact surface terminal 302, and thereby to modify the capacitance between the contact surface 302 and the pressure detector terminal 304. In the embodiment of FIG. 3A, a high dielectric permittivity material 308 such as a polyvinylidene difluoride (pvdf) film is applied over the pressure detector terminal 304 in order to enhance the sensor 300 response. The pvdf film is a non-piezoelectric film, however the pvdf film can be replaced by a piezoelectric pvdf film without departing from the scope of the present sensor. Moreover, a skilled person would understand that depending on the sensor 300, in some applications the high dielectric permittivity material 308 may not be required, for instance in low force range applications where the dielectric sheet 306 is often thinner.

Moreover, it shall be understood that the dielectric sheet could be replaced by a compressible electrically conductive sheet made from a weakly conductive material such as silicone filled with carbon particles or an optical material that is electrically conductive, when used in sensors that measure a change in electrical resistance such as in a resistive sensor or a change in optical properties. According to one embodiment, an electrically conductive membrane connected to a current source such as a DC source is placed between the contact surface 302 and the electrically conductive sheet The electrically conductive sheet is adapted to compress according to pressure applied to the contact surface terminal 302, and thereby to modify the resistance between the contact surface 302 and the pressure detector terminal 304. The pressure detector terminal 304 is a printed circuit board (PCB) having electrodes adapted to measure a resistance between the electrodes and the contact surface terminal 302.

Dielectric Sheet

Figure 3B:
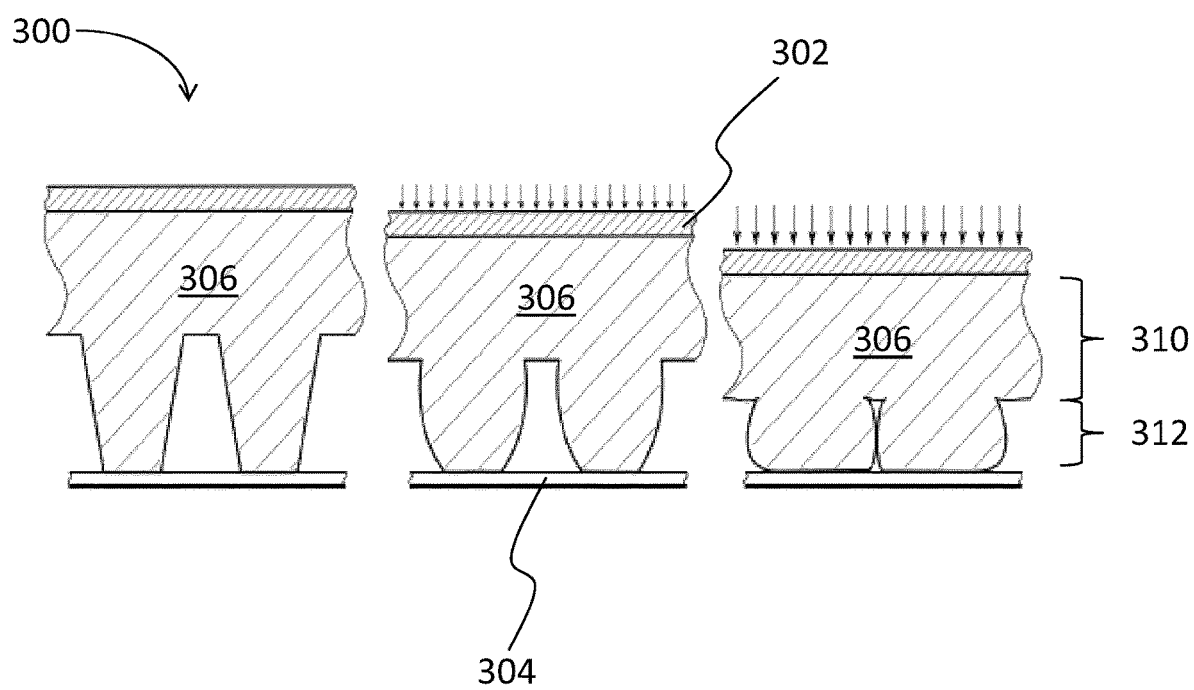
FIG. 3B presents a side sectional view of the tactile sensor of FIG. 3A having applied thereon various pressure levels, according to one embodiment.

As further presented in FIGS. 3A and 3B, according to one embodiment, the dielectric sheet 306 has a first region 310 that is full and a second region 312 that defines a plurality of protrusions 314 that are similar in shape or, at least macroscopically, identical in shape. Each protrusion 314 has a frusto-conical shape, as better shown in FIG. 4.

When a pressure is applied to a given location of the contact surface terminal 302, a set of corresponding protrusions 314 are accordingly compressed towards the detector terminal 304, locally reducing the space between the contact surface terminal 302 and the detector terminal 304 and accordingly modifying the capacitance there between. The detector terminal 304 is adapted to locally measure the capacitance and variations of the capacitance in order to detect localized pressure applied to the contact surface terminal 302.

Notice from FIG. 3B that upon a localized pressure application on the contact surface terminal 302, a corresponding set of protrusions 314 are compressed by expanding into adjacent cavities and the localized pressure does not increase a thickness of portions of the dielectric sheet 306 that surround the localized pressure. As a result, the dielectric sheet is adapted to provide a localized compression such that when the compressible dielectric sheet is subjected to a localized pressure, an associated portion of its body is locally deformed only by at least partially extending into at least one adjacent cavity, according to a deformation ratio that is indicative of the capacitance or resistance of the compressible sheet at the location of the localized pressure.

It shall be recognized that although the sensor 300 depicted in FIG. 3A, presents the dielectric sheet 306 with the protrusions 314 oriented towards the detector terminal 304, the dielectric sheet 306 could be flipped and the protrusions 314 could be oriented towards the contact surface terminal 302.

Figure 4:
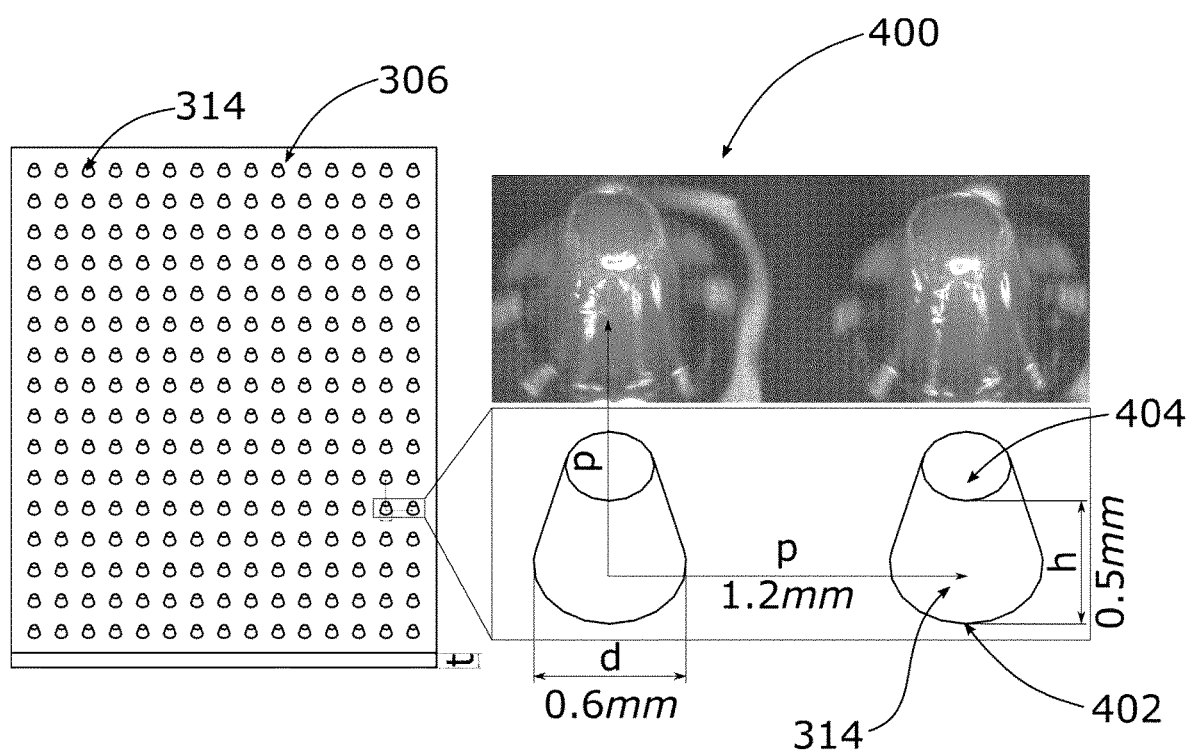
FIG. 4 presents a top view of the dielectric sheet of FIG. 3A, according to one embodiment.

The dielectric sheet 306, and more particularly the flexibility, the disposition, shape and dimensions of the protrusions 314, allows the detector terminal 304 to detect pressures ranging from 0 Newtons to at least 50 Newtons applied to an area as small as 126 square millimeters ($mm^2$) with an accuracy $1 \cdot 10^{-4}$ Newtons when placed on a detector terminal 304 with electrodes each having a surface ranging between 6.25 $mm^2$ and 16 $mm^2$, according to one embodiment According to one embodiment, the protrusions as presented in FIG. 4, have width at a base 402 that is less than 1 mm are spaced apart by a distance of less than 1 mm. In another embodiment, the protrusions have a width at a base 402 that is less than 0.8 mm and are spaced apart by a distance of less than 0.8 mm. In yet another embodiment, the protrusions have a width at a base 402 that is less than 0.6 mm and are spaced apart by a distance of less than 0.6 mm and provide 87 protrusions within an area of 126 $mm^2$, namely a density of approximately more than 25 per square centimeter, preferably more than 40 protrusions per square centimeter, and more preferably more than 60 protrusions per square centimeter. The recited ranges for protrusion dimensions and density likewise can apply correspondingly for the dimensions of the structures of cell walls and cavities.

It shall be recognized that the pressure ranges detected by the terminal 304 depend on the flexibility of the dielectric material, the shape and dimensions of the protrusions or the pattern of cavities ablated in the dielectric material.

It shall further be recognized that the dielectric material is flexible and following an ablation process the ablated dielectric material defines protrusions that are highly compressible. According to one embodiment the dielectric is a flexible urethane material made from a urethane resin having a dielectric constant ranging between 4 and 6 and a Shore Hardness ranging between 00-30 to A-60 (e.g. Extra Soft to Soft).

According to one embodiment, as further presented in FIG. 4, each protrusion has a base 402 measuring 0.6 mm in diameter, a flat tip 404 measuring 0.3 mm in diameter, and a height measuring 0.5 mm. In this embodiment the protrusions are equidistantly distributed on the dielectric sheet 306 according to a square grid configuration and a distance or pitch between each protrusion measures 1.2 mm. However, those parameters can vary depending on the desired sensor 300 performance or sensitivity.

A skilled person will recognize that the dimensions of each protrusion 314 can differ from the embodiment presented in FIG. 4. Moreover, the protrusions 314 of FIG. 4 have identical dimensions, however, it shall be recognized that the protrusions can have variable controlled dimensions, depending on their position on the dielectric sheet 306. For instance, two types of protrusions 314 can be sequentially distributed on the dielectric sheet 306, a first type of protrusion 314 being shorter in height or wider at the base 402 or the tip 404 than a second type of protrusion 314. In another instance, two types of protrusions 314 can be distributed according to a portion of the dielectric sheet 306, a portion of the dielectric sheet 306 such as a center portion, a corner portion or a half portion can have distributed protrusions that have different dimensions then those distributed in a remaining portion of the dielectric sheet 306. The types of protrusions shall not be limited to one of two types of protrusions, a plurality of types of protrusions can be controllably dimensioned and distributed in the dielectric sheet 306, without departing from the scope of the present dielectric sheet 306.

A skilled person will also recognize that the protrusions could be distributed differently on the dielectric sheet 306, than in the square grid distribution of FIG. 4. Indeed, the protrusions 314 can be distributed according to any controlled configuration. For instance, the protrusions 314 can be distributed in a circular configuration, in a staggered configuration or in any other suitable configuration.

Moreover, the distance between each protrusion can differ from one application to another and can also be variable depending on the configuration of the protrusion distribution.

Also, it shall be recognized that the that the protrusions can have a different shape and can be part of a compressible body structure defined by cavities that have been ablated. The compressible body structure can define walls forming cells having a circular shape, a conic shape, a honeycomb shape or any other suitable shape. The cells can be open or enclosed within the surfaces of the dielectric sheet.

Method of Producing the Dielectric Sheet

Figure 5:
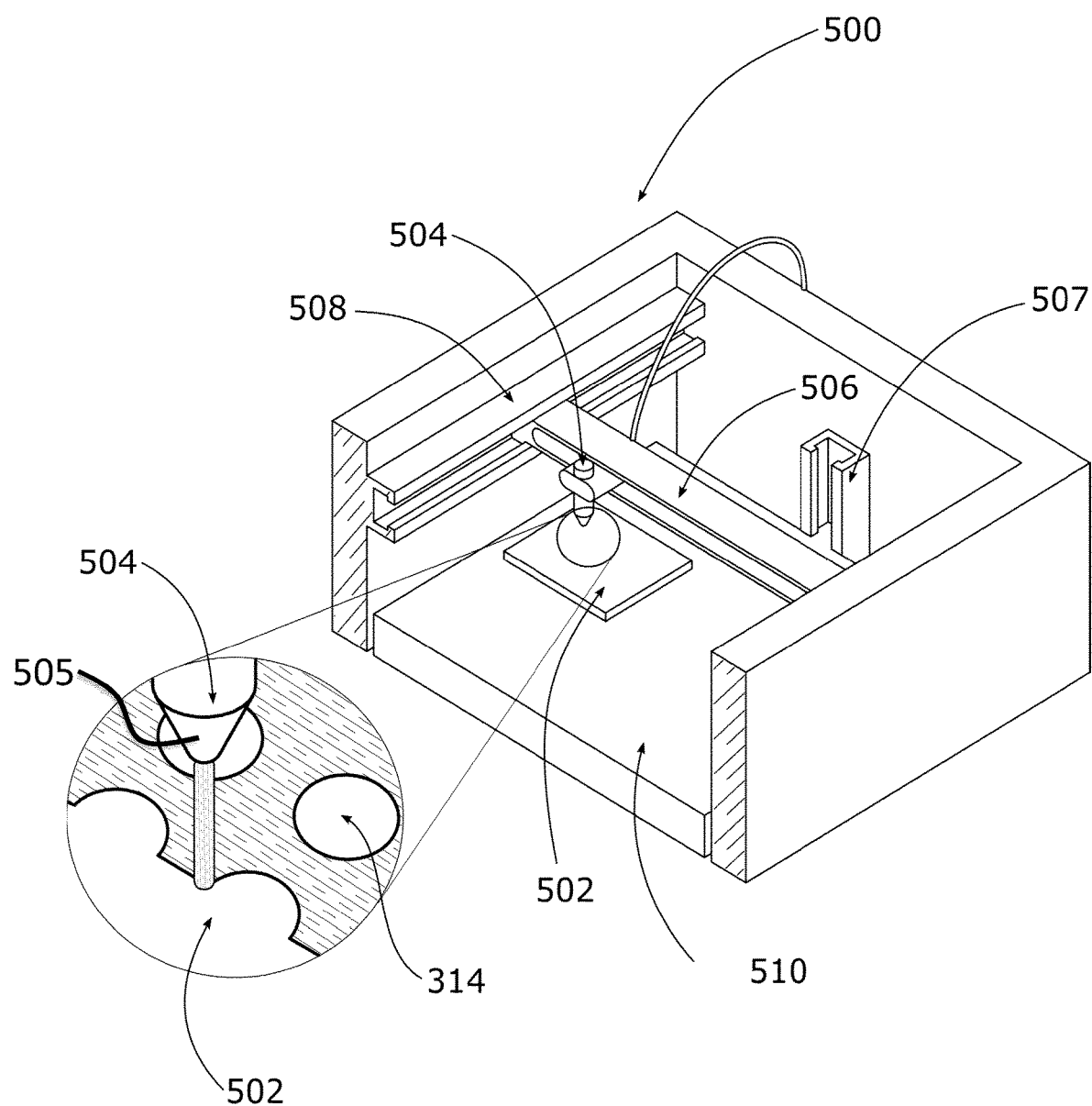
FIG. 5 presents a schematic side view of a laser etching machine having a uniform dielectric sheet placed therein for producing the dielectric sheet of FIG. 3A, according to one embodiment.

According to one embodiment and as presented in FIG. 5, a conventional laser etching machine 500 is used to ablate, cut or engrave the protrusions 314 from a conventional flexible or soft dielectric material 502 having an uniform thickness. This laser etching machine 500 has a probe 504 adapted to direct a laser beam onto the flexible dielectric material 502. The probe 504 is displaceable along a horizontal rail 506 and a vertical rail 508 and displacement along both axes is thereby provided. The displacement of the probe 504 is programmable according to an ablation path and adapted instructions are provided to the laser etching machine 500 to produce a desired pattern of protrusions or cavities and produce the compressible dielectric sheet 306. The distance between the cutting surface 510 and a light emitting head 505 of the laser probe 504 is adjustable along an elevation rail 507. In this embodiment the cutting surface 510 is slideably mounted on the elevation rail 507 and the distance between the light emitting head 505 and the cutting surface 510 is thereby adjusted. This distance parameter is critical to the geometry of the protrusions 314. A dielectric sheet 502 will not be etched or cut if it is out of focus with respect to the laser probe, such as when the dielectric sheet 502 is too far away from the light emitting head 505, therefore the laser machine 500 must be adjusted according to the properties of the dielectric sheet 502 and the ablation path. The laser etching or ablation machine can be, for example, a $CO_2$ laser cutter or an Nd:YAG laser for surface ablation allowing to produce cavities in the sheet, and subsurface ablation can also be performed. Whether the resulting material has protrusions on one side (or both), an open cellular structure on one side, an open cellular structure throughout the material, or closed cells, the material is compressible in response to the applied pressure. Laser processing of the sheet can provide the precision required for the texturing or structuring of the sheet material that is required for spatially uniform tactile sensitivity. The resulting texturing of the sheet surface can be protrusions 314 or cavities between a continuous "cellular" wall structure.

Moreover, according to a predetermined distance of the head 505 with respect to the uniform dielectric material 502 (i.e. reference coordinates of the probe), a laser power setting and probe speed setting are also provided in order to control the diameter, the pitch, and the height of each protrusion 314. A laser power setting that is too strong or a probe speed that is too slow will cut through the uniform dielectric material 502. A laser power setting that is too low or a probe speed that is too fast will produce protrusions 314 that are too short. Once the required parameters for the laser power and probe speed are determined for the desired etching pattern the laser etching machine can repeatably produce numerous suitably identical dielectric sheets 306 within a short period of time, as presented in FIGS. 4 and 5, without having to resort to lengthy molding or casting methods.

Figure 6:
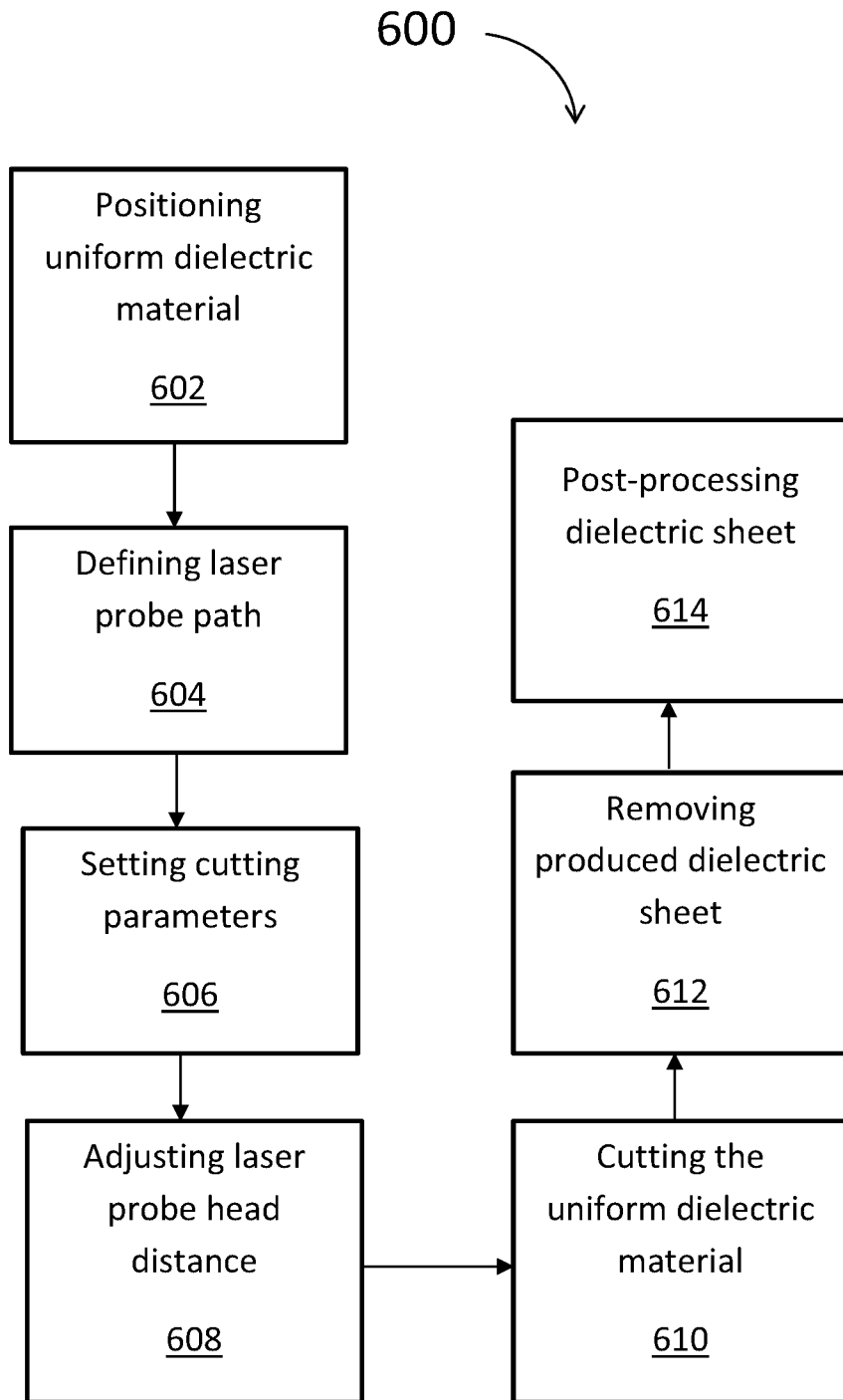
FIG. 6 presents a block diagram of a method of producing the dielectric sheet of FIG. 3A, according to one embodiment.

According to one embodiment as presented in FIG. 6, there is a method 600 of producing the dielectric sheet 306 for the capacitive tactile sensor 300, as concurrently presented in FIG. 3A. The method 600 consists of positioning 602 the uniform dielectric material 502 onto a cutting surface 510 of the laser cutter 500, as concurrently presented in FIG. 5. The dielectric material 502 must previously have been chosen according to the desired application with respect to various properties of the material such as the dielectric permittivity, the thickness and the hardness. The sensor 300 having to measure a wide range of forces might require a dielectric material 502 that is thicker and harder than the sensor 300 having to measure a lower range of forces with however greater precision. Indeed, the thicker the material 502, the larger the measureable force range but the lower the measurement precision (i.e. lower response rate). Also, the softer the material 502, the higher the measurement precision but the lower the saturation threshold. Moreover, the shape and dimensions of the dielectric material 502 must be adapted or adaptable to the shape and dimensions of the sensor 300.

The method 600 further consists of defining a laser probe path 604 according to a predetermined microstructure pattern to be cut for creating a desired distribution of protrusions 314 on the dielectric material 502. The predetermined microstructure pattern indicates the type of distribution of the protrusions 314 (i.e. grid, circular, staggered, etc.), the protrusion 314 density or resolution (i.e. space between protrusions or pitch), and the geometry of the protrusions 314 (i.e. base diameter, flat tip diameter and height).

The method 600 further consists of setting the cutting parameters 606 depending on the uniform dielectric material 502 and the characteristics of the laser etching machine 500. For instance, the laser power and probe speed must be adjusted according to the dielectric material, the microstructure pattern to be cut, and the distance between the probe head 505 and the dielectric material 502.

The method 600 further consists of adjusting the probe head distance 608 with respect to the cutting surface 510 according to a predetermined reference height. The probe head distance is adjusted according to the predetermined reference height but also according to an offset resulting from the support of the dielectric material 502. The support is needed in order to prevent unwanted overheating of the material 502 when placed on the cutting surface 510.

The method 600 further consists of cutting 610 the uniform dielectric material 502 according to the previously set parameters in order to produce the dielectric sheet 314.

Once produced, the dielectric sheet 314 is removed 612 from the cutting surface 510 and any excess fluids (i.e. melted by-product of the dielectric material 502) produced by the cutting is removed during a post-processing 614 of the dielectric sheet 314.

It shall be recognized that the method 600 of FIG. 6 is adapted to produce a single dielectric sheet but is also adapted to produce a plurality of dielectric sheets. Indeed, the setting of the cutting parameters 606 can be adapted to produce more than one dielectric sheet and the cutting 610 of the uniform dielectric material 502 can include the cutting through the uniform dielectric material 502 at a perimeter region of the dielectric sheet 314 in order to produce several dielectric sheets from a single dielectric material 502. Also the post-processing 614 can include the separation of dielectric sheets 314.

The production of a plurality of dielectric sheets 314 at once, enables producing a greater number of dielectric sheets within a given period of time. In addition to being highly accurate and repeatable, the present method allows to increase dielectric sheet generation productivity.

Moreover, it shall be recognized that the method of producing a dielectric sheet 600 of FIG. 6 can be repeated as needed. According to one embodiment of the method 600, the laser probe path is pre-defined, the cutting parameters are preset and the laser probe distance is adjusted in advance. The method 600 only includes positioning the uniform dielectric material 602 onto the cutting surface 510, cutting the uniform dielectric material 610, removing the produced dielectric sheet 612 and post-processing the dielectric sheet 614. The uniform dielectric material being positioned onto the cutting surface 510 that has been adjusted in advance with respect to a required laser probe distance. The uniform dielectric material being cut 610 according to the pre-defined laser probe path and preset cutting parameters.

Pressure Detector

Figure 7A:
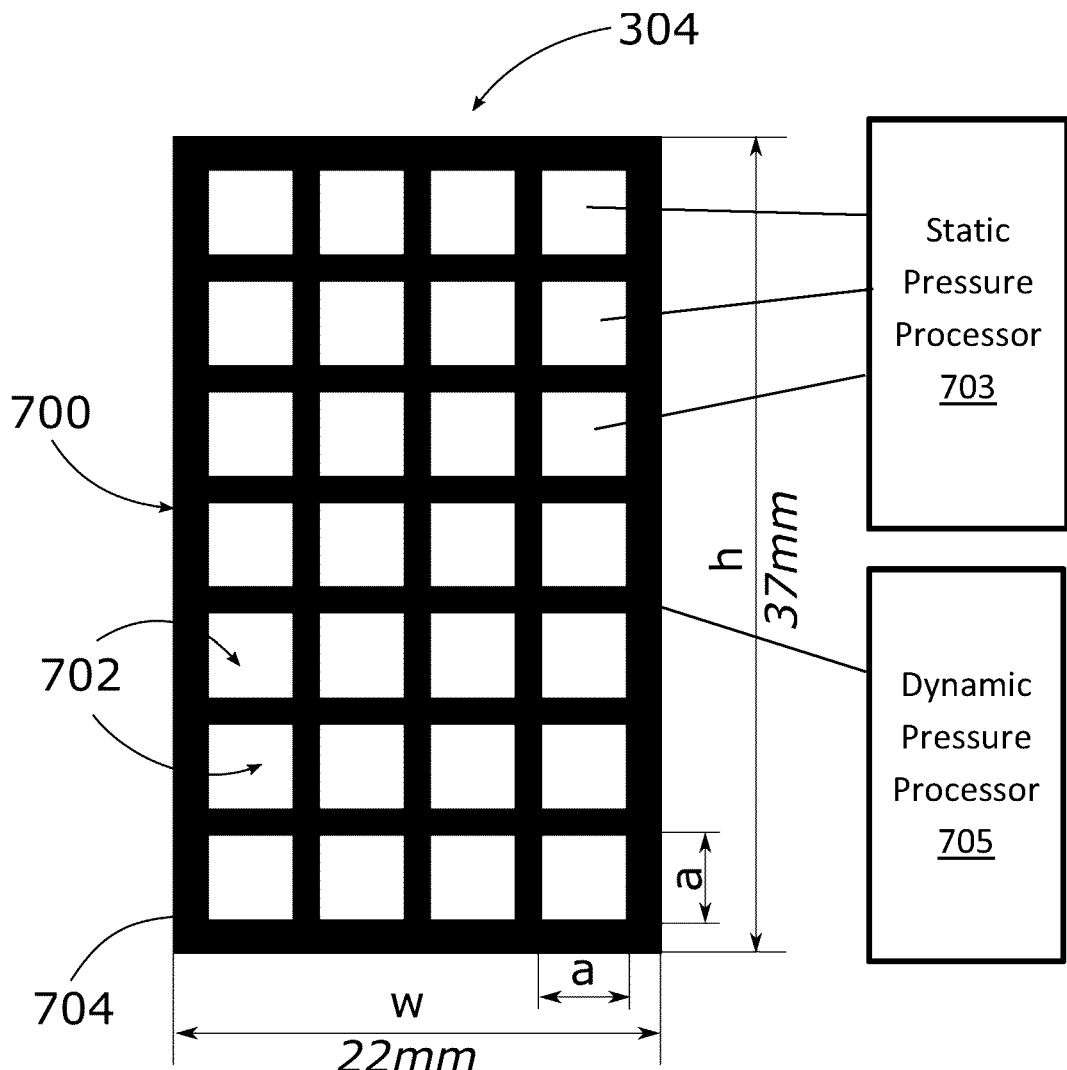
FIG. 7A presents a top view of the printed circuit board of FIG. 3A, the printed circuit board defining a pattern of electrodes for integrated static and dynamic pressure measurement, according to one embodiment.

According to one embodiment, presented in FIG. 7A is a conductive plate 700 of the detector terminal 304, as concurrently presented in FIG. 3A. The conductive plate 700 is a form of substrate such as a Printed Circuit Board (PCB) that defines a grid-like pattern of electrodes and is adapted to provide integrated static and dynamic sensing of pressure. The grid-like pattern of electrodes includes a number of static pressure sensors 702 connected to a static pressure processor 703, and a single dynamic pressure sensor 704 connected to a dynamic pressure processor 705. The integrated static and dynamic sensors (702 and 704) are positioned to contact the high dielectric permittivity material 308 or directly contact the dielectric sheet 306. The static sensors 702 are adapted to provide pressure measurements for localizing an applied pressure such as a normal pressure or a shear force. The dynamic sensor 704 is adapted to provide pressure change measurements for detecting a contact event such as slippage or object recognition. According to one embodiment, the static sensors 702 are square shaped electrodes or tactile pixels (taxels) that are adapted to take static pressure measurements. The dynamic sensor 704 is a single grid shaped electrode that is adapted to take dynamic pressure measurements over the surface of the detector terminal 304. The static sensors 702 are disposed on a same surface as the detector terminal 304 in an array configuration so as to be in an integrated arrangement with the dynamic sensor 704, as better shown in FIG. 7A.

In the embodiment of FIG. 7A, the static sensors 702 are an array of twenty-eight tactile pixels (taxels) arranged on the detector terminal 304 or printed circuit board (PCB) measuring 22 mm×37 mm. Each static sensor 702 is an individual square measuring 3.625 mm×3.625 mm. When a pressure is applied to a given region of the contact surface 302, a displacement of the dielectric sheet 306 occurs at a portion corresponding to the given region. A change in the capacitance at a taxel 702 or group of taxels 702 adjacent to the portion of the dielectric sheet 306 is measured and a mapping of the capacitance measurement at each taxel 702 indicates where the pressure has been applied. Each taxel electrode 702 can be provided with a via in the PCB to be connected to the processor 703. It will be appreciated that between electrodes 702 and the at least one electrode 704, an insulating gap or material is provided. The surface area occupied by the insulation reduces overall sensitivity.

The dynamic sensor 704 presented in FIG. 7A is adapted to measure a variance in capacitance irrespective of where the change in pressure occurred. The localization of the pressure being provided by the static sensors 702, when a variance in pressure is detected, the localization of the change in pressure is determined by the measurement provided by at least one of the static sensors 702.

The combination of the dynamic sensor 704 and the static sensors 702 on a single layer of the conductive plate is adapted to detect a dynamic pressure and a static pressure simultaneously. According to pie-chart 706 of FIG. 7A, forty-five percent of the detector terminal 304 surface is adapted to detect a static pressure, forty-two percent of the detector terminal 304 surface is adapted to detect a dynamic pressure, and the balance of thirteen percent is attributed to a lost area that is occupied by the insulation present between the electrodes 702 and 704. As can be noticed, the surface for detecting a static pressure and the surface for detecting dynamic pressure are relatively equal—between forty-two and forty-five percent.

Figure 7B:
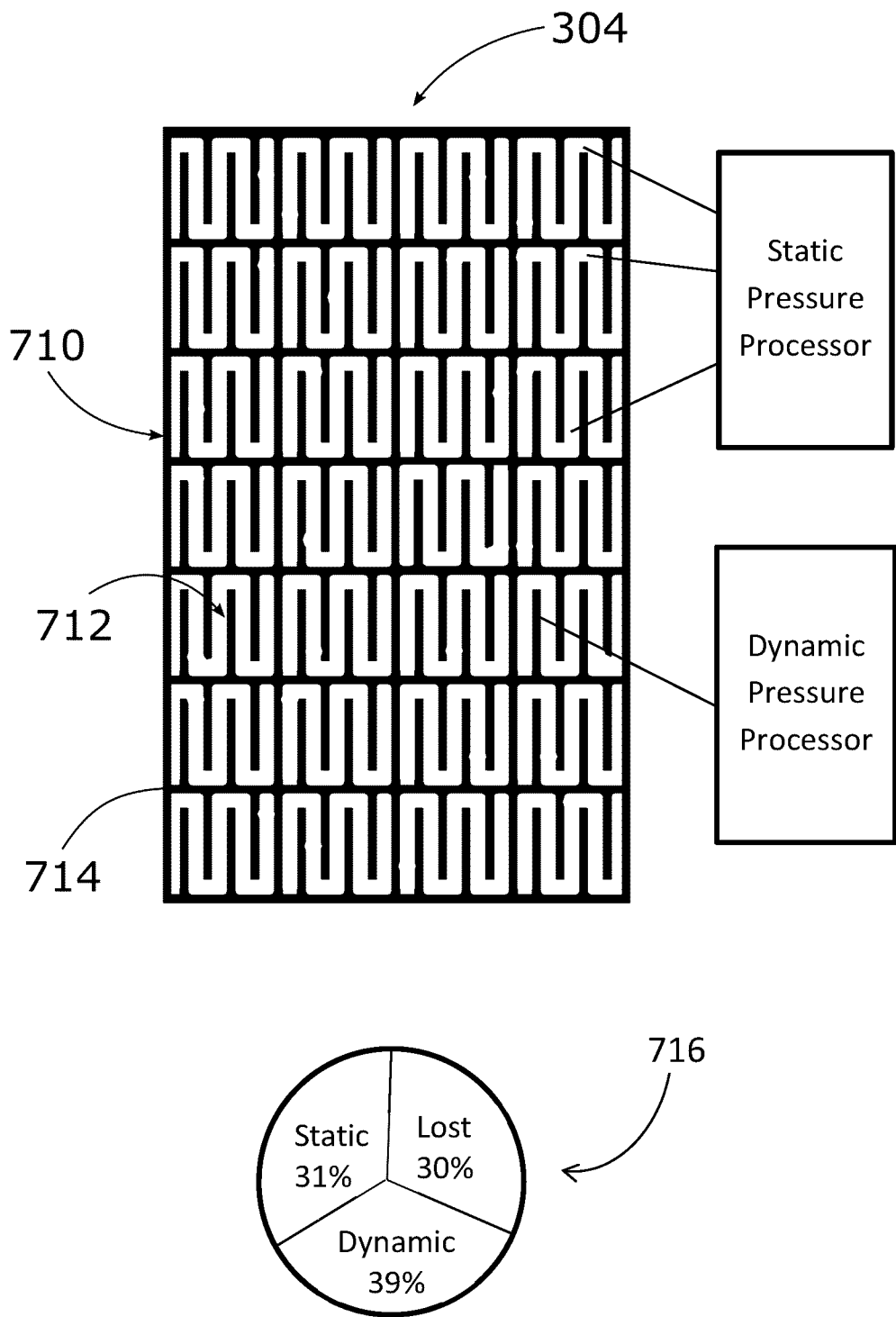
FIG. 7B presents a top view of the printed circuit board of FIG. 3A, the printed circuit board defining a pattern of electrodes for integrated static and dynamic pressure measurement, according to an alternate embodiment.

According to an alternate embodiment of the detector terminal 304, presented in FIG. 7B is a conductive plate 710 defining an interlaced pattern of electrodes adapted to provide integrated static and dynamic pressure readings. According to one embodiment, wave shaped electrodes 712 are individually adapted to take static pressure measurements, and a comb shaped electrode 714 is adapted to take dynamic pressure measurements over the surface of the detector terminal 304. The wave shaped electrodes 712 and the comb shaped electrode 714 are interlaced and provide a relative equal distribution of static pressure readings and dynamic pressure readings on the terminal 304. For instance, as presented by pie-chart 716, thirty-one percent of the terminal surface 704 is occupied by the wave shaped electrodes 712, and thirty-nine percent of the terminal surface 704 is occupied by the comb shaped electrode 714. The balance of thirty percent being attributed to a lost area that is occupied by the insulation present between the electrodes 702 and 704. Even though a greater space is attributed to the lost area than in the conductive plate 700 of FIG. 7A, the dynamic pressure and the static pressure are still detectable at a relatively equal proportion—about thirty percent.

Figure 8:
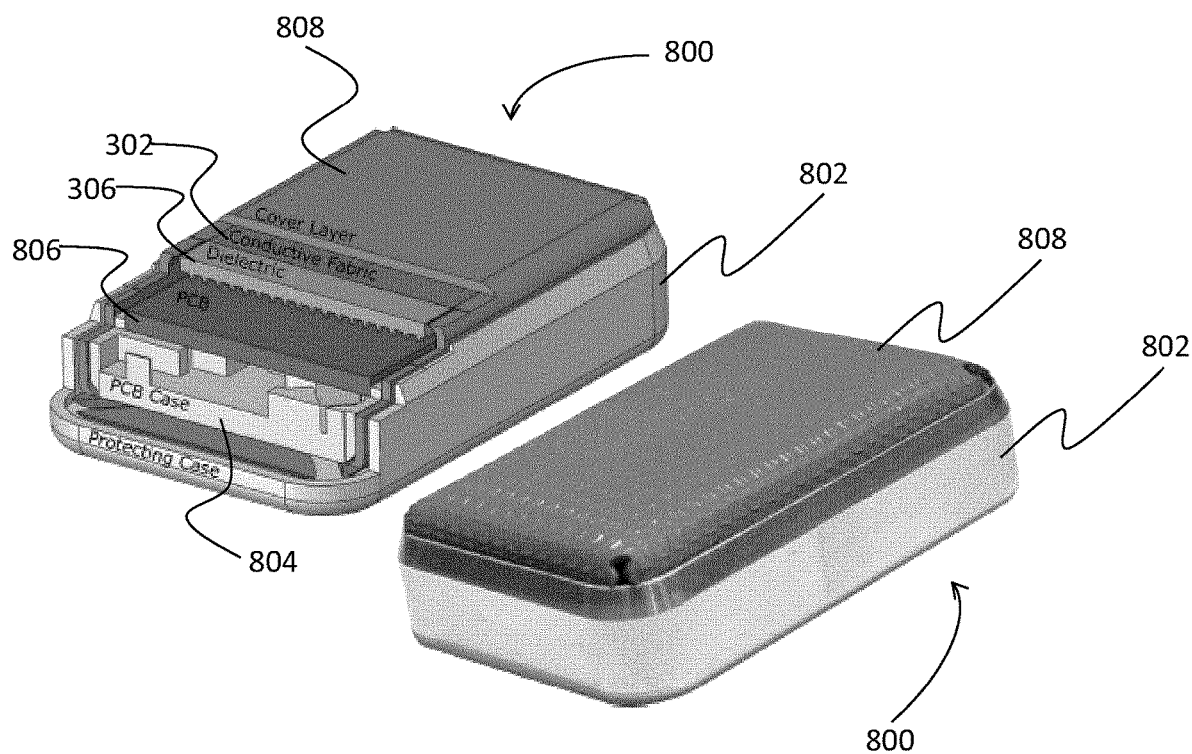
FIG. 8 presents a tactile capacitive sensor having the dielectric sheet and the printed circuit board of FIG. 3A and a sectional view drawing thereof, according to one embodiment.

Presented in FIG. 8 is an assembled capacitive tactile sensor 800 and a sectional view drawing of the assembled capacitive tactile sensor 800, according to one embodiment. The assembled tactile sensor 800 has a protective casing 802 that is adapted to receive a PCB (Printed Circuit Board) case 804, on which a PCB 806 is mounted. The PCB 806 has mounted or printed thereon the conductive plate 700 or 710, various electronic components, and Integrated Circuits adapted to simultaneously process static pressure and dynamic pressure detected by the static electrodes (702 or 712) and dynamic electrodes (704 or 714) of FIGS. 7A and 7B. The PCB case 804 is adapted to protect the PCB 806 from bending while pressure is applied on the sensor 800. The dielectric 306 is placed over the PCB 806 with the microstructured pattern facing the taxels (702, 704 or 712 and 714). The conductive fabric 302 is placed over the dielectric 306, which then, together with the conductive plate 700 or 710, forms the capacitor. The same conductive fabric 302 is used to shield the sensor from environmental electrical noise.

Moreover, a protective layer of silicone rubber 808 covers the sensor 800. As can be noticed, the silicone rubber 808 has a crisscross texture in order to promote greater contact friction and facilitate manipulation tasks. The protective casing 802 is made from aluminum and is designed with a customizable flange to allow the tactile sensor 800 to be installed in a variety of different robotic grippers.

The modular design of the tactile sensor 800 makes it easy to service or to replace parts of the sensor 800. Moreover, the materials used to build the capacitive tactile sensor 800 being off-the-shelf products, which reduces the cost of manufacturing. The use of off-the-shelf products to build the capacitive tactile sensor 800 also provides a greater level of consistency in the materials and therefore greater consistency in the manufactured sensors 800.

Applications in Robotics and Manufacturing

Figure 9:
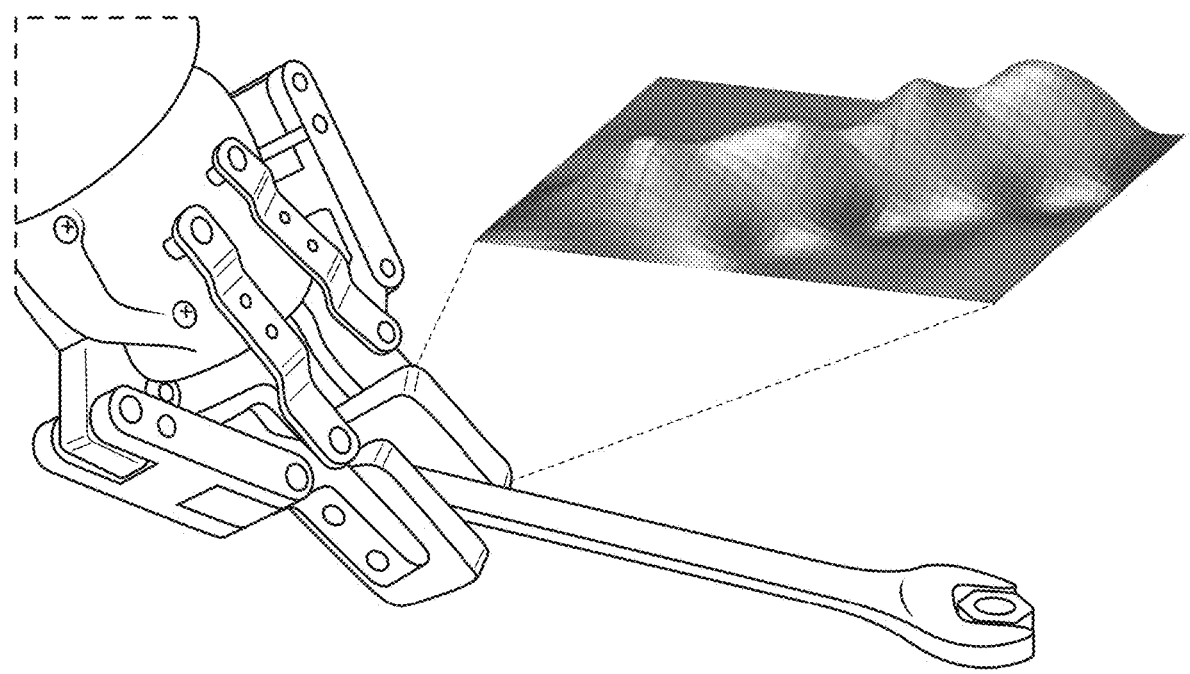
FIG. 9 presents an illustration of a robot gripper equipped with the tactile sensor of FIG. 8 and holding a tool while showing a pressure map generated using the tactile sensor.

The device as illustrated in FIG. 8 can be applied to a robot as illustrated schematically in FIG. 9. A robot gripper equipped with the tactile sensor 800 of FIG. 8 generates a pressure map as shown in FIG. 9. The robot controller can interpret the pressure map to determine whether how the object has been grasped. When the object is not securely or correctly grasped, the robot controller can release the object and attempt a new grasp. Changes in the pressure map can indicate if the grip on the object is stable. The dynamic pressure sensor can also sense the vibration caused by a slipping of an object held by the gripper. The tactile sensor 800 is thus an integrated part of the robotic system and improves efficiency and performance of the robotic system so that manipulation and control of parts or components by the gripper lead to improvements in manufacturing of products including the parts or components manipulated by the gripper.

The invention claimed is:

1. A method of manufacturing a compressible sheet made from a dielectric material or a weakly conductive material for a sensor adapted to measure either a localized change in capacitance or conductivity corresponding to an applied pressure on the compressible sheet, the method comprising:

positioning a flexible sheet made from a dielectric material or a weakly conductive material in a laser ablation machine;

determining a least one ablation path according to a desired pattern of cavities and according to a size and a shape of each cavity of the desired pattern of cavities;

adjusting parameters of the laser ablation machine according to the at least one ablation path and at least one property of the flexible sheet;

ablating the flexible sheet with the ablation machine according to the adjusted parameters and forming the compressible sheet having a body structure that is complementarily shaped according to the desired pattern of cavities; and removing ablation debris from the body structure;

wherein the body structure is adapted to provide a localized compression such that when the compressible sheet is subjected to a localized pressure, an associated portion of the body structure is locally deformed only by at least partially extending into adjacent cavities, according to a deformation ratio that is indicative of the capacitance or resistance of the compressible sheet at the location of the localized pressure.

2. The method of manufacturing the compressible sheet of claim 1 wherein the flexible sheet defines projections protruding from a base portion of the body structure.

3. The method of manufacturing the compressible sheet of claim 2 wherein the projections have a frustoconical shape.

4. The method of manufacturing the compressible sheet of claim 1 wherein the desired pattern of cavities defines a single cavity.

5. The method of manufacturing the compressible sheet of claim 1 wherein the flexible sheet has a plurality of body portions that differ in shape or size and each of the plurality of body portions provides a known compression index for an associated region of the compression sheet.

6. The method of manufacturing the compressible sheet of claim 1 wherein the flexible sheet is uniformly distributed within the compression sheet and provides a known compression index for the compression sheet.

7. The method of manufacturing the compressible sheet of claim 1 further comprising ablating the flexible sheet with the ablation machine for defining at least one ablation debris extraction port.

8. The method of manufacturing the compressible sheet of claim 7 wherein the flexible sheet has a layer made from a non-ablatable material.

9. The method of manufacturing the compressible sheet of claim 8 wherein the ablation machine is a sub-surface ablation machine.

10. A dielectric or weakly conductive compressible sheet for a capacitive or resistive tactile sensor, the sheet being positionable between a conductive membrane and a conductive plate of the tactile sensor, the compressible sheet comprising:

a body having a first surface and an opposite second surface, the first surface and the second surface being uniformly distanced when at rest;

the first surface being adapted to contact one of the conductive membrane or the conductive plate;

the second surface being adapted to contact another one of the conductive membrane or the conductive plate; and the body defining between the first and second surfaces, at a predetermined region, a plurality of laser ablated uniform cavities that are evenly distributed and operatively identical in order to provide a known compression index at the predetermined region of the compressible sheet.

11. The compressible sheet of claim 10 wherein the body is adapted to provide a localized compression such that when the compressible sheet is subjected to a localized pressure, an associated portion of the body is locally deformed only by at least partially extending into at least one adjacent cavity, according to a deformation ratio that is indicative of the capacitance or resistance of the compressible sheet at the location of the localized pressure.

12. The compressible sheet of claim 10 wherein the plurality of laser ablated uniform cavities form projections extending from an internal portion of the body to the first surface.

13. The compressible sheet of claim 12 wherein the projections have a frustoconical shape.

14. A capacitive or resistive tactile sensor comprising:

a conductive membrane connected to a ground or to a power source and adapted to deform according to an external pressure application;

a laser ablated dielectric or weakly conductive sheet having a body with a first surface and an opposite second surface, the first surface being in contact with the conductive membrane and being adapted to deform according to the external pressure application in conjunction with the conductive membrane;

a conductive plate having a pattern of electrodes for measuring a voltage variation or a current variation with the conductive membrane according to the deformation of the laser ablated sheet, the second surface being adapted to directly contact the conductive plate; and the body defining between the first and second surfaces, at a predetermined region, a plurality of uniform laser ablated cavities that are evenly distributed and operatively identical in order to provide a known compression index at the predetermined region of the compressible sheet.

15. The tactile sensor of claim 14 wherein the body is adapted to provide a localized compression such that when the compressible sheet is subjected to a localized pressure, an associated portion of the body is locally deformed only by at least partially extending into at least one adjacent cavity, according to a deformation ratio that is indicative of the capacitance or resistance of the compressible sheet at the location of the localized pressure.

16. The tactile sensor of claim 14 wherein the plurality of laser ablated uniform cavities form projections extending from an internal portion of the body to the first surface.

17. The tactile sensor of claim 16 wherein the projections have a frustoconical shape.

18. The tactile sensor of claim 14 wherein the tactile sensor is a capacitive tactile sensor and wherein the conductive plate is a substrate, the substrate comprising:

a dielectric contacting surface;

a plurality of static pressure sensing electrodes uniformly distributed on the dielectric contacting surface, each of the plurality of electrodes being adapted to connect to a corresponding one of a plurality of static pressure processing circuits; and at least one dynamic pressure sensing electrode uniformly spread across the dielectric contacting surface between the plurality of static pressure sensing electrodes, each of the at least one electrode being adapted to connect to at least one corresponding dynamic pressure processing circuit.

19. A method of manufacturing a product, the method comprising:

providing on a gripper of a robot a tactile sensor comprising a dielectric or weakly conductive compressible sheet as defined in claim 10;

using said gripper to grip an object;

using at least one of a map of static pressure and a dynamic pressure reading from said tactile sensor to determine at least one of a correctness and a stability of a grip of said object;

changing a grip of said object, if required, as a function of said at least one of a correctness and a stability of a grip of said object; and using said robot to manipulate said object to perform at least one step in manufacturing said product.

* * * * *